United States Patent
King et al.

(10) Patent No.: US 7,304,297 B1
(45) Date of Patent: Dec. 4, 2007

(54) THERMAL IMAGER UTILIZING IMPROVED RADIOMETRIC CALIBRATION TECHNIQUE

(75) Inventors: Stephen R. King, Santa Cruz, CA (US); Thomas Heinke, Santa Cruz, CA (US); Paul S. Carlson, Santa Cruz, CA (US); Stefan H. Warnke, Santa Cruz, CA (US)

(73) Assignee: Raytek Corporation, Santa Cruz, CA (US)

( * ) Notice: Subject to any disclaimer, the term of this patent is extended or adjusted under 35 U.S.C. 154(b) by 152 days.

(21) Appl. No.: 10/883,590

(22) Filed: Jul. 1, 2004

(51) Int. Cl.
*G12B 13/00* (2006.01)
(52) U.S. Cl. .................................................. 250/252.1
(58) Field of Classification Search .............. 250/252.1
See application file for complete search history.

(56) References Cited

U.S. PATENT DOCUMENTS

| | | | |
|---|---|---|---|
| 4,608,598 A | 8/1986 | Murakami et al. | |
| 4,634,294 A | 1/1987 | Christol et al. | |
| 4,866,275 A * | 9/1989 | Jaeger et al. | 250/330 |
| 5,091,646 A | 2/1992 | Taylor | |
| 5,386,117 A | 1/1995 | Piety et al. | |
| 5,420,419 A | 5/1995 | Wood | |
| 5,524,984 A | 6/1996 | Hollander et al. | |
| 5,637,871 A | 6/1997 | Piety et al. | |
| 5,663,562 A | 9/1997 | Jones et al. | |
| 5,675,149 A | 10/1997 | Wood et al. | |
| 5,705,811 A | 1/1998 | Harder et al. | |
| 5,836,694 A | 11/1998 | Nguyen | |
| 5,866,900 A | 2/1999 | Jacobson et al. | |
| 5,994,701 A * | 11/1999 | Tsuchimoto et al. | 250/351 |
| 6,144,030 A | 11/2000 | Ray et al. | |
| 6,144,031 A | 11/2000 | Herring et al. | |
| 6,353,223 B1 * | 3/2002 | Ookawa | 250/330 |
| 6,486,473 B2 | 11/2002 | Salapow et al. | |
| 6,515,285 B1 * | 2/2003 | Marshall et al. | 250/352 |
| 6,630,670 B2 | 10/2003 | Salisbury et al. | |
| 6,670,596 B2 | 12/2003 | Tsai et al. | |
| 7,157,705 B2 | 1/2007 | Hamrelius et al. | |
| 2002/0195562 A1 * | 12/2002 | Salapow et al. | 250/330 |
| 2003/0146383 A1 * | 8/2003 | Knauth et al. | 250/338.1 |
| 2004/0264542 A1 | 12/2004 | Kienitz | |

OTHER PUBLICATIONS

Manual entitles "ThermoView Ti30 High Performance Thermal Imager for Predictive Maintenance," bearing a copyright date of 2003.

* cited by examiner

*Primary Examiner*—David Porta
*Assistant Examiner*—Christopher G. Webb
(74) *Attorney, Agent, or Firm*—Nelson Mullins Riley & Scarborough LLP

(57) ABSTRACT

A thermal imaging apparatus comprises a thermal image camera having a lens and a display. The camera further includes a focal plane array located behind the lens for converting imaging radiation to produce an image signal for further processing. A shutter mechanism is operative to selectively inhibit exposure of the focal plane array to the imaging radiation such that the focal plane array produces a reference signal. Processing circuitry is operative to receive the image signal and produce a corresponding thermal image on the display. The processing circuitry is further operative to utilize the image signal and the reference signal to derive temperature information.

25 Claims, 4 Drawing Sheets

THERMAL IMAGER UTILIZING IMPROVED RADIOMETRIC CALIBRATION TECHNIQUE

BACKGROUND OF THE INVENTION

The present invention relates generally to thermal imagers. More particularly, the invention relates to a thermal imager that utilizes an improved technique to calibrate a focal plane array so as to provide accurate radiometric information.

Thermal imaging cameras are used in a wide variety of applications, such as predictive maintenance in industrial facilities. While past imagers often utilized a scanning technique, modern imagers generally incorporate an infrared (IR) focal plane array (FPA) for producing the thermal image. FPAs have many advantages, such as the speed at which successive images can be produced for display.

Although FPAs provide good imagery of the scene, it is much more difficult to use an FPA imager to accurately measure the temperature of objects in the scene. It is believed that others have provided radiometers employing FPAs, but these devices have required complicated cooling or temperature stabilization mechanisms in order to operate properly. Thus, there is a need in the art for an FPA thermal imager that does not require a complicated cooling mechanism for radiometric operation.

SUMMARY OF THE INVENTION

According to one aspect, the present invention provides a thermal imaging apparatus comprising a thermal image camera having a lens and a display. The camera further includes a focal plane array located behind the lens for converting imaging radiation to produce an image signal for further processing. A shutter mechanism is operative to selectively inhibit exposure of the focal plane array to the imaging radiation such that the focal plane array produces a reference signal. Processing circuitry is operative to receive the image signal and produce a corresponding thermal image on the display. The processing circuitry is further operative to utilize the image signal and the reference signal to derive temperature information.

In presently preferred embodiments, the processing circuitry operates to produce the temperature information based on a difference between the image signal and the reference signal. A temperature sensor may also be provided to provide a temperature measure indicative of an ambient temperature of the focal plane array. For example, the temperature sensor may be associated with the shutter. In some cases, the shutter may comprise a flag element selectively rotatable into a closed position between the focal plane array and the scene.

Preferably, the apparatus may include a memory containing calibration information for the focal plane array. In such embodiments, the processing circuitry can utilize the calibration information during production of the temperature information. For example, the calibration information may indicate target temperature as a function of signal strength of the image signal.

Often, the memory may also contain adjustment information for each pixel of the focal plane array. The adjustment information, which may comprise gain and offset information, may be used by the processing circuitry to adjust the difference.

According to other aspects, the present invention provides a method of deriving temperature information in a focal plane array imager. One step of the method involves obtaining a reference signal from the focal plane array representing a uniform temperature reference scene. In another step, an image signal is obtained from the focal plane array representing an image scene. A difference between the image signal and the reference signal is also determined. In addition, a temperature measure indicative of an ambient temperature of the focal plane array is provided. The difference and the temperature measure is then utilized to derive temperature information for the image signal.

In accordance with preferred methodology, the reference scene may be provided by a shutter mechanism that selectively inhibits exposure of the focal plane array to imaging radiation. In such cases, the temperature measure may be provided utilizing a temperature sensor associated with the shutter mechanism. For example, the shutter mechanism may be operable to close on a periodic basis.

Often, the temperature information may be derived by applying adjustment information for each pixel of the focal plane array to the difference so as to yield an adjusted difference. Calibration information for the focal plane array can be utilized to produce the temperature information based on the adjusted difference and the temperature measure. For example, the adjustment information may comprise gain and offset information.

Still further aspects of the present invention are provided by an apparatus comprising a focal plane array for converting imaging radiation to produce an image signal for further processing. A shutter mechanism is operative to provide a uniform temperature reference scene such that the focal plane array produces a reference signal. A temperature sensor is also operative to provide a temperature measure indicative of an ambient temperature of the focal plane array. The apparatus also includes processing circuitry operative to utilize the image signal, the reference signal and the temperature measure to derive target temperature information.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
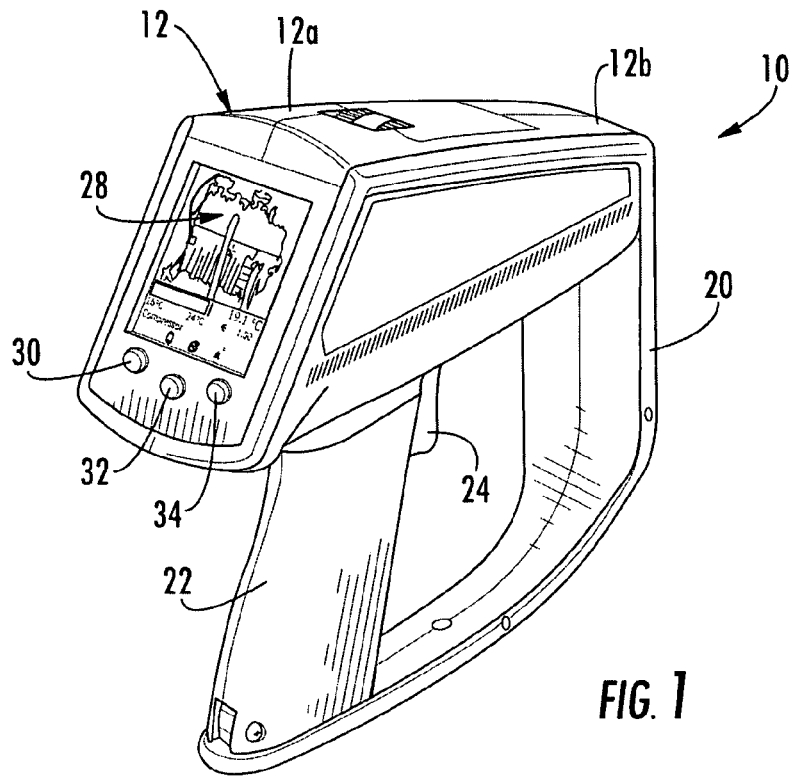
FIG. 1 is a rear perspective view of a thermal imager constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
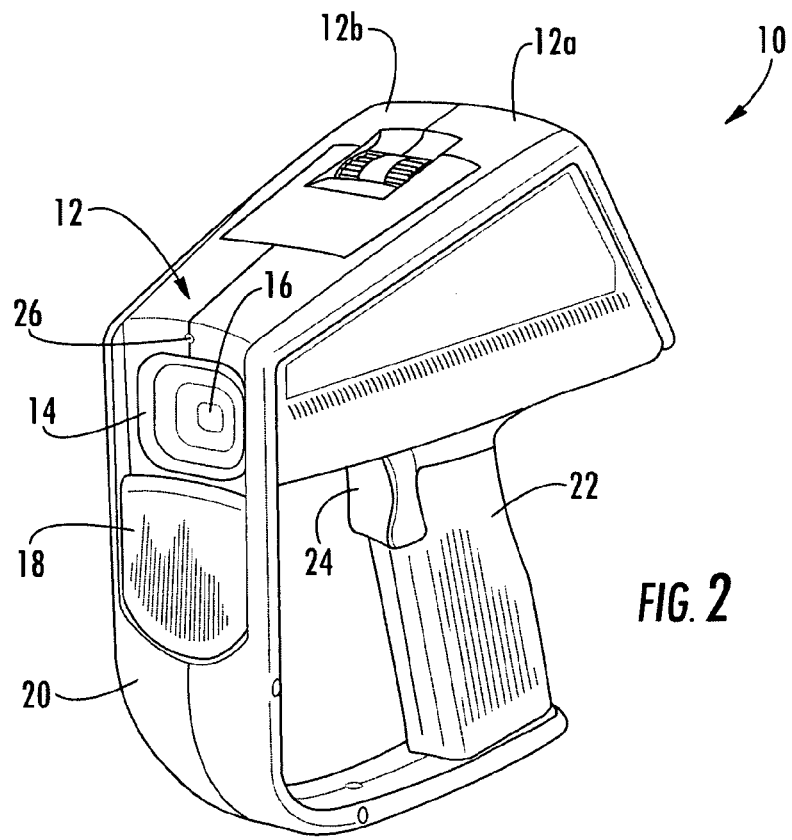
FIG. 2 is a front perspective view of the thermal imager of FIG. 1.

FIGS. 1 and 2 illustrate a thermal imager 10 constructed in accordance with the present invention. Imager 10 includes a housing 12 in which the components of a thermal image camera are located. Preferably, housing 12 is formed by complementary left and right housing portions 12a and 12b which are joined together during assembly. While any suitable material can be utilized, housing portions 12a and 12b are preferably formed of a rigid high impact plastic material. Selected regions of housing 12 may be desirably overmolded with a softer polymeric material.

As shown in FIG. 2, housing 12 includes a front portion enclosing a hood 14 behind which the device's lens 16 is located. One skilled in the art will recognize that the target energy enters the device through lens 16. A lens cover 18 is provided to cover lens 16 when imager 10 is not in use. Preferably, lens cover 18 is opaque to passage of infrared radiation so as to protect the imager's internal components when the unit is not being used.

In this case, lens cover 18 slides up and down in a channel provided in front shroud 20. Shroud 20 extends to a location under handle 22 to facilitate placement of the entire unit in a computer docking station for recharging and specialized programming. A trigger 24 is located on handle 22, as shown. Trigger 24 permits the user to store selected images in the device's internal memory. In the illustrated embodiment, laser diode 26 projects a dot of light forward of the imager to facilitate aiming.

Figure 3:
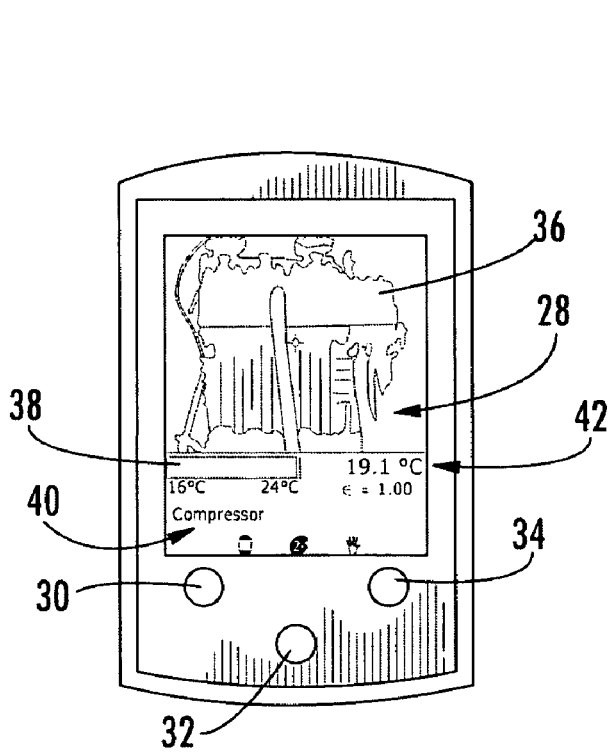
FIG. 3 is an enlarged elevation of the thermal imager's display as depicted in FIG. 1.

Referring now to FIG. 3, a display 28 is preferably located at the rear of imager 10. In this case, the display is configured as a color display of the LCD type. For example, the display may be a typical LCD touch panel as are often used in personal digital assistants (PDAs) and other types of common electronic devices. A plurality of function buttons 30, 32 and 34 are also located on the rear portion of imager 10.

In this depiction, display 28 shows a variety of information, including a thermal image 36 of the equipment being inspected. A temperature gradient scale 38 and other information may also be provided in different regions of the display. For example, the display 28 indicates at 40 that the machine being inspected is a "compressor" based on stored information. The target temperature at the "crosshairs" of the image is indicated at 42.

Figure 4:
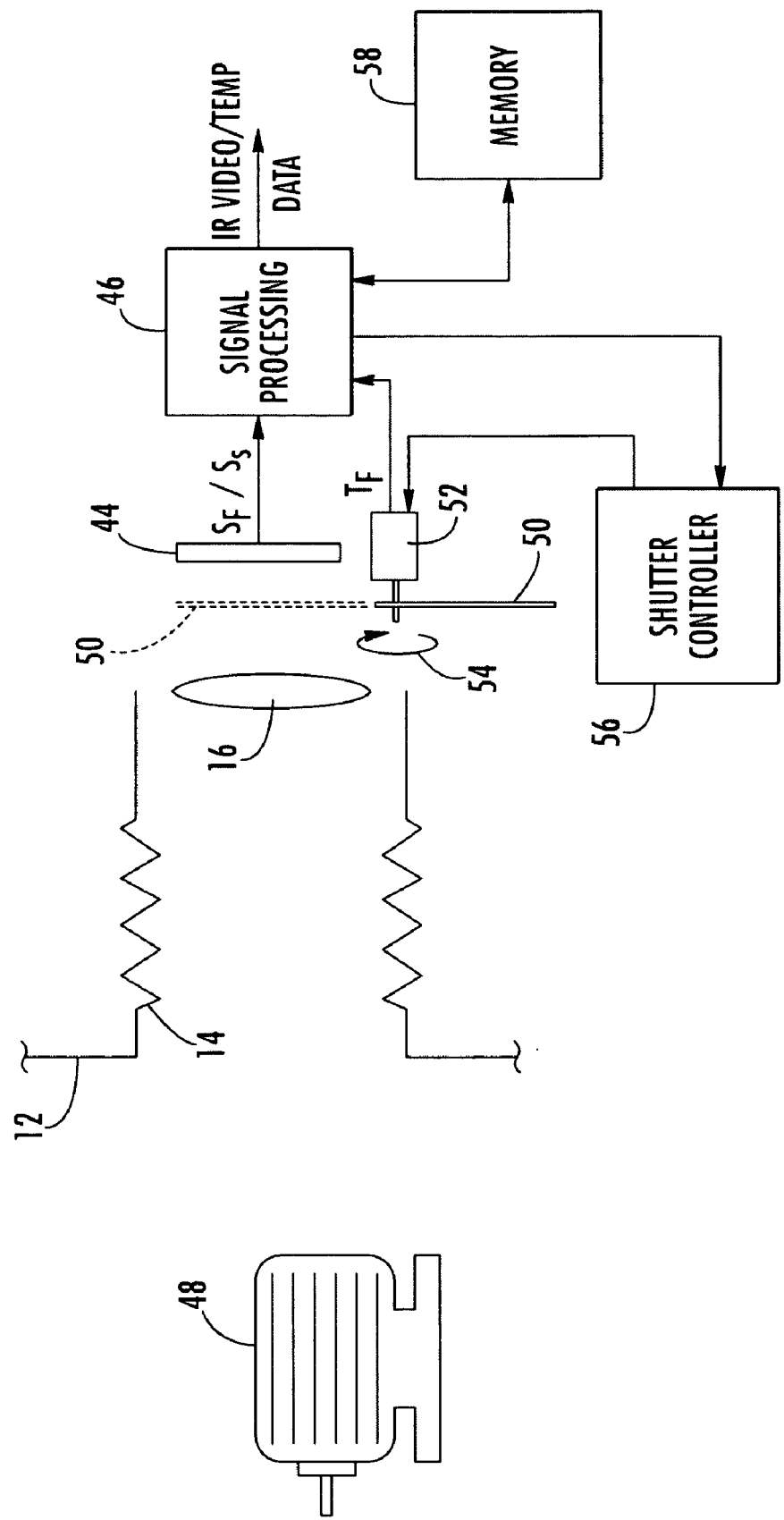
FIG. 4 is a diagrammatic representation showing internal components of the thermal imager of FIG. 1.

Referring now to FIG. 4, certain internal components of imager 10 will be described. When lens cover 18 is moved to the down position, incident radiation is allowed to enter hood 14. The radiation passes through lens 16 and impinges focal plane array (FPA) 44. In presently preferred embodiments, FPA 44 is an infrared (IR) FPA of any suitable type, such as alpha-silicon or vanadium oxide. (Such devices are available, for example, from Raytheon Company.)

FPA 44 converts the incident radiation into electrical signals $S_S$ which are then provided to signal processing circuitry 46. Circuitry 46 processes the raw signals to produce IR video/temperature data that can be shown on display 28. In this regard, display 28 will typically depict a thermal image of the target equipment 48, along with an accurate indication of the temperature at various locations on the image. For example, various temperatures on the image may be indicated by color, which can be correlated with the colors in gradient 38. As noted above, a numerical indication of the actual temperature at the image crosshairs can also be depicted at 42.

While FPA imagers are known to provide good imagery of the scene, it is much more difficult to utilize them for accurate temperature measurements. In the past, complicated cooling or temperature stabilization mechanisms have been provided to maintain the FPA at a predetermined temperature during use. Such cooling and temperature stabilization mechanisms are expensive, greatly add to the complexity of the imager, and increase the imager's power consumption.

Thus, the present invention provides a technique to ascertain temperature information from an FPA signal without internal cooling. Toward this end, imager 10 includes a shutter which can be used to provide a reference scene to processing circuitry 46. In this embodiment, the shutter is configured as a "flag" 50 rotated by a small motor 52 (as indicated by arrow 54). Motor 52 is operated by shutter controller circuitry 56, which is itself controlled by signal processing circuitry 46.

Typically, flag 50 will be moved to a position in front of FPA 44 when imager 10 is initially powered on. Thereafter, motor 52 will move flag 50 into position in front of FPA 44 periodically during operation (such as every 2–3 minutes). When flag 50 is moved to this position, a reference signal $S_F$ is produced by FPA 44. This reference signal is correlated with an ambient temperature signal $T_F$. In this regard, a suitable temperature sensor is typically mounted on flag 50 (or temperature well connected to flag 50) to provide a measure of the ambient temperature at this location. Signal processing circuitry utilizes signals $S_F$, $S_S$ and $T_F$ along with stored calibration information in order to generate the desired temperature data.

Figure 5:
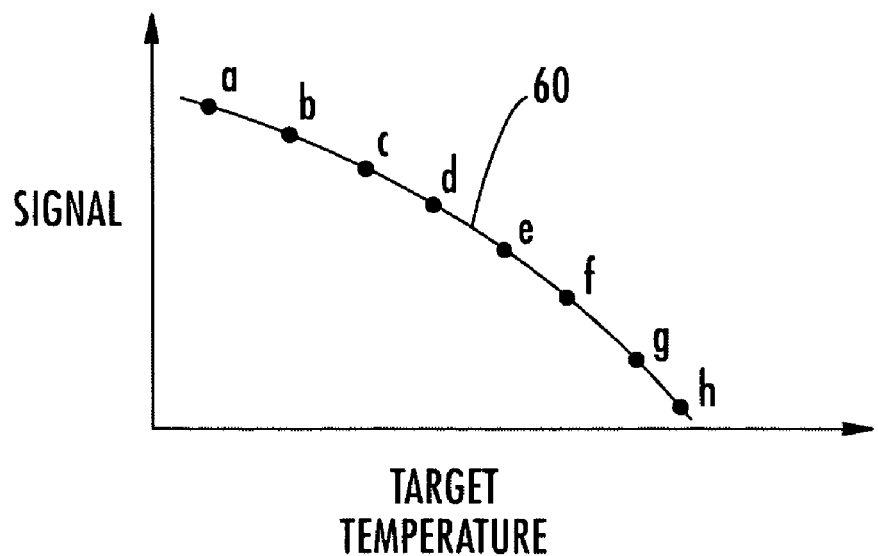
FIGS. 5 and 6 are graphs representing signal strength versus target temperature of a particular FPA during calibration and use, respectively.

FIG. 5 illustrates preferred calibration information that can be stored in memory 58. At the time unit 10 is manufactured, the specific FPA 44 for that unit can be calibrated. In this case, calibration occurs at multiple scene temperatures throughout a range. Signal strength at each of the scene temperatures is obtained to generate a target temperature versus signal strength curve.

This is illustrated in the example of FIG. 5, where signal strength measurements have been taken at a total of eight calibration temperatures (a–h). In this exemplary case, these target temperatures may be temperature points that are equally spaced in a range extending from 0° C. through 250° C. The resulting measurements can be used to interpolate a curve 60. It will be appreciated that each other pixel in FPA 44 will also exhibit this same shape of curve. Information representing curve 60 is preferably stored in memory 58 in the form of an electronic lookup table.

Figure 6:
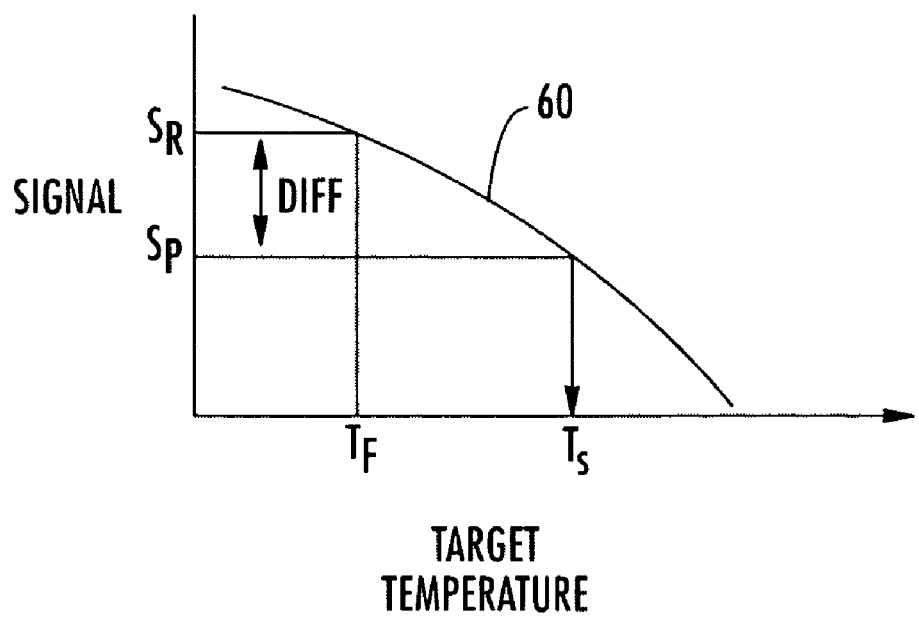

FIG. 6 illustrates a technique whereby curve 60 can be utilized to calculate actual temperature at a particular pixel, to wit:

a) Knowing the flag temperature use the lookup table to find the corresponding reference signal strength $S_R$. This value $S_R$ is then used for all pixels.

b) Subtract the reference frame from the signal frame thus generating a difference "DIFF" signal for each pixel. DIFF can be positive or negative, as one skilled in the art will appreciate.

c) For each pixel calculate the pixel scene signal $S_P$, by adding the DIFF signal for the pixel to $S_R$.

d) Knowing $S_P$ for each pixel use the lookup table to find the scene temperature $T_S$ for each pixel.

There are slight variations in gain and offset between adjacent pixels, but these can be corrected by individual adjustments. Thus, the raw difference signal may be adjusted by the pixel gain and offset before the actual temperature is obtained.

There are also variations in the responsivity of each pixel with changes in ambient temperature. Because these variations are approximately linear, however, a relatively simple linear correction can often be applied. In accordance with a preferred embodiment, this linear correction can be accomplished using the following formula:

$$\text{CORRECTION} = DIFF \times [(1 + \alpha \times (T - T_{CAL})]$$

where, $\alpha$ is the value required to make the device read the same temperature at ambient and 50° C.; and $T_{CAL}$ is the ambient temperature of the instrument at calibration.

In many cases, it will also be desirable to provide a global gain adjustment depending on target temperature. For example, many preferred embodiments of the present invention provide a low gain or a high gain for temperatures above and below a predetermined threshold, respectively. In one particularly preferred embodiment, the threshold temperature may be 125° C. In other words, if something in the scene has a temperature of greater than 125° C., the instrument automatically chooses low gain. If nothing in the scene is greater than 125° C., high gain is automatically selected.

Figure 7:
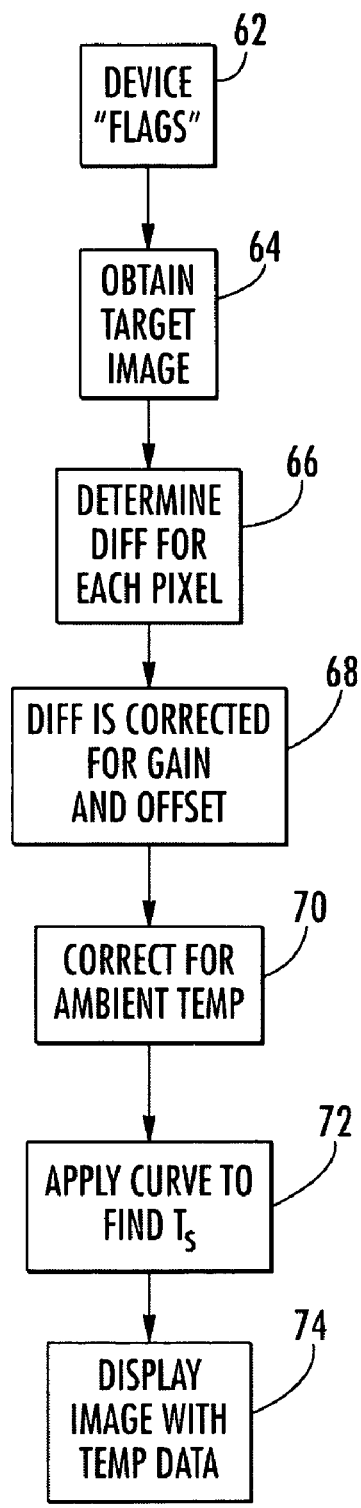
FIG. 7 is a flow diagram showing steps performed in accordance with a preferred calibration technique of the present invention.

FIG. 7 provides an overview of the preferred methodology for determining temperature as described above. As indicated at 62, flag 50 rotates to a position in front of FPA 44 in order to obtain a reference scene. Next, as indicated at 64, a target image is obtained to produce an image signal. The "DIFF" for each pixel can then be determined (as indicated at 66).

As indicated at 68, DIFF is then corrected for gain and offset on a pixel by pixel basis. Next, as indicated at 70, the DIFF for each pixel can be corrected for variations in ambient temperature. Because the flag temperature $T_F$ is known, calibration information can be utilized to determine $T_S$ at each pixel (as indicated at 72). Finally, the signal processing circuitry can utilize the temperature information thus obtained in order to display a thermal image along with associated temperature data (as indicated at 74).

It can thus be seen that the present invention provides a thermal imager utilizing an improved radiometric calibration technique. According to the invention, accurate temperature information corresponding to points in a thermal image can be obtained using a focal plane array. This eliminates the need for complicated cooling or temperature stabilization mechanisms and the like in order to maintain the focal plane array at a reference temperature.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A thermal imaging apparatus capable of measuring temperature comprising:

a thermal image camera having a lens and a display;

said camera further including a focal plane array located behind said lens for converting imaging radiation to produce an image signal for further processing;

a shutter mechanism operative to selectively inhibit exposure of said focal plane array to said imaging radiation such that said focal plane array produces a reference signal;

processing circuitry operative to receive said image signal and produce a corresponding thermal image on said display; and said processing circuitry further operative to utilize said image signal and said reference signal to derive a temperature and indicate same on said display.

2. A thermal imaging apparatus as set forth in claim 1, wherein said processing circuitry operates to produce said temperature based on a difference between said image signal and said reference signal.

3. A thermal imaging apparatus as set forth in claim 2, further comprising a temperature sensor operative to provide a temperature measure indicative of an ambient temperature of said shutter mechanism.

4. A thermal imaging apparatus as set forth in claim 3, wherein said temperature sensor is thermally associated with said shutter mechanism.

5. A thermal imaging apparatus as set forth in claim 2, further comprising a memory containing calibration information for said focal plane array, said processing circuitry utilizing said calibration information during production of said temperature information.

6. A thermal imaging apparatus as set forth in claim 5, wherein said calibration information indicates target temperature as a function of signal strength of said image signal.

7. A thermal imaging system as set forth in claim 5, wherein said memory further contains adjustment information for each pixel of said focal plane array, said adjustment information being used by said processing circuitry to adjust said difference.

8. A thermal imaging system as set forth in claim 7, wherein said adjustment information comprises gain and offset information.

9. A thermal imaging apparatus as set forth in claim 1, further comprising a temperature sensor operative to provide a signal indicative of an ambient temperature of said shutter mechanism.

10. A thermal imaging apparatus as set forth in claim 9, wherein said temperature sensor is associated with said shutter.

11. A thermal imaging apparatus as set forth in claim 10, wherein said shutter comprises a flag element selectively rotatable into a closed position behind said focal plane array.

12. A method of deriving temperature information in a focal plane array imager having a shutter mechanism, comprising steps of:

(a) obtaining a reference signal from said focal plane array representing a uniform temperature reference scene;

(b) obtaining an image signal from said focal plane array representing an image scene;

(c) determining a difference between said image signal and said reference signal;

(d) providing a temperature measure indicative of an ambient temperature of said shutter mechanism; and (e) utilizing said difference and said temperature measure to derive temperature information in the form of a numeric temperature for at least one location of said image signal.

13. A method as set forth in claim 12, wherein said reference scene is provided by a shutter mechanism that selectively inhibits exposure of said focal plane array to imaging radiation.

14. A method as set forth in claim 13, wherein said temperature measure is provided in step (c) utilizing a temperature sensor associated with said shutter mechanism.

15. A method as set forth in claim 13, wherein said shutter mechanism is operable to close on a periodic basis.

16. A method as set forth in claim 12, wherein step (e) further comprises:
   (f) applying adjustment information for each pixel of said focal plane array to said difference so as to yield an adjusted difference; and
   (g) utilizing calibration information for said focal plane array to produce said temperature information based on said adjusted difference and said temperature measure.

17. A method as set forth in claim 16, wherein said adjustment information comprises gain and offset information.

18. A method as set forth in claim 16, wherein said calibration information is in the form of a electronic lookup table.

19. A method as set forth in claim 16, wherein said calibration information indicates target temperature as a function of signal strength of said image signal.

20. Apparatus comprising:
   a focal plane array for converting imaging radiation to produce an image signal for further processing;
   a shutter mechanism operative to provide a uniform temperature reference scene such that said focal plane array produces a reference signal;
   a temperature sensor operative to provide a temperature measure indicative of an ambient temperature of said shutter mechanism; and
   processing circuitry operative to utilize said image signal, said reference signal and said temperature measure to derive target temperature information.

21. Apparatus as set forth in claim 20, wherein said processing circuitry operates to produce said temperature information based on a difference between said image signal and said reference signal.

22. Apparatus as set forth in claim 21, further comprising a memory containing calibration information for said focal plane array, said processing circuitry utilizing said calibration information during production of said temperature information.

23. Apparatus as set forth in claim 22, wherein said calibration information indicates target temperature as a function of signal strength of said image signal.

24. Apparatus as set forth in claim 22, wherein said memory further contains adjustment information for each pixel of said focal plane array, said adjustment information being used by said processing circuitry to adjust said difference.

25. Apparatus as set forth in claim 24, wherein said adjustment information comprises gain and offset information.

* * * * *